US012807256B2

(12) United States Patent
Korsumaki

(10) Patent No.: US 12,807,256 B2
(45) Date of Patent: Nov. 24, 2026

(54) STACKING ASSEMBLY AND ACCESSORY STACKING KIT

(71) Applicant: BOMBARDIER RECREATIONAL PRODUCTS INC., Valcourt (CA)

(72) Inventor: Mika Korsumaki, Rovaniemi (FI)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 212 days.

(21) Appl. No.: 18/285,758

(22) PCT Filed: Apr. 8, 2022

(86) PCT No.: PCT/IB2022/053320
§ 371 (c)(1),
(2) Date: Oct. 5, 2023

(87) PCT Pub. No.: WO2022/219477
PCT Pub. Date: Oct. 20, 2022

(65) Prior Publication Data

US 2024/0367743 A1 Nov. 7, 2024

Related U.S. Application Data

(60) Provisional application No. 63/175,305, filed on Apr. 15, 2021.

(51) Int. Cl.
*B62J 9/24* (2020.01)
*B60R 9/06* (2006.01)
(Continued)

(52) U.S. Cl.
CPC ....................................... *B62J 9/24* (2020.02); *B60R 9/06* (2013.01); *B62J 9/27* (2020.02); *B62M 27/02* (2013.01)

(58) Field of Classification Search
CPC .......... B62J 9/27; B62J 9/23; B60Y 2200/252
See application file for complete search history.

(56) References Cited

U.S. PATENT DOCUMENTS 4,480,773 A * 11/1984 Krauser ..................... B62J 7/00 224/430
4,826,057 A * 5/1989 Yamada ................. B62K 5/027 224/42.31

(Continued)

FOREIGN PATENT DOCUMENTS

EP 3281852 A1 * 2/2018 ................ B62J 7/08

OTHER PUBLICATIONS

International Search Report of PCT/IB2022/053320; Kari Rodriguez; Jun. 27, 2022.

*Primary Examiner* — Nathan J Newhouse
(74) *Attorney, Agent, or Firm* — BCF LLP

(57) ABSTRACT

A stacking assembly and accessory stacking kit for connecting to a vehicle. The assembly includes an accessory platform including: a platform body to receive an accessory on a top surface thereof, at least one attachment device connected to the platform body, and a connection portion pivotally connected to the platform body; and at least one attachment fixture for selectively receiving the at least one attachment device, the attachment fixture being configured for connecting to the vehicle, the stacking assembly being configured such that when the stacking assembly is installed on the vehicle: the connection portion being connected to the bumper of the vehicle, the attachment fixture being connected to the bumper and when the attachment device is received in and secured to the attachment fixture, the platform body being secured to the vehicle to prevent pivoting of the platform body.

17 Claims, 16 Drawing Sheets

(51) Int. Cl.
*B62J 9/27* (2020.01)
*B62M 27/02* (2006.01)

(56) References Cited

U.S. PATENT DOCUMENTS 4,893,692 A * 1/1990 Smith .................... B62M 27/02 180/190
5,465,882 A * 11/1995 Shinohara ................ B62J 35/00 180/219
6,016,943 A * 1/2000 Johnson .................... B60R 9/00 224/452
6,296,163 B1 * 10/2001 Kitao ......................... B62J 7/06 410/101
6,378,748 B1 * 4/2002 Cox .......................... B60R 9/06 224/511
6,491,124 B1 * 12/2002 Thompson ................. B62J 7/04 297/215.12
6,659,566 B2 * 12/2003 Bombardier ........... B62D 33/02 298/17 R
7,128,341 B1 * 10/2006 Dahl ......................... B60R 9/06 180/908
7,275,787 B1 * 10/2007 Grove ........................ B62J 1/12 297/215.11
7,854,460 B2 * 12/2010 Tweet ........................ B62J 7/00 180/908
8,678,699 B2 * 3/2014 Maguire .................... B62J 7/04 280/288.4
9,511,704 B2 12/2016 Massicotte et al.
9,751,592 B2 9/2017 Labbe et al.
10,744,953 B2 8/2020 Labbe et al.
2004/0239088 A1 * 12/2004 Rondeau .................... B62J 9/23 280/769
2005/0212335 A1 9/2005 Johnson et al.
2010/0147916 A1 * 6/2010 Roberts ...................... B62J 9/12 224/408
2012/0292357 A1 * 11/2012 Tennyson .................. B60R 9/06 224/521
2014/0319306 A1 * 10/2014 Massicotte ............ B60P 7/0815 248/503
2017/0203803 A1 7/2017 Boutin et al.
2017/0341693 A1 * 11/2017 Rzepecki ................... B62J 1/28
2020/0339040 A1 * 10/2020 Labbe ................ B60K 15/0406
2021/0039749 A1 * 2/2021 Labbe .................... B62M 27/02
2021/0188185 A1 6/2021 Hedlund et al.

* cited by examiner

STACKING ASSEMBLY AND ACCESSORY STACKING KIT

CROSS-REFERENCE

The present application claims priority to U.S. Provisional Patent Application No. 63/175,305, entitled "Stacking Assembly and Accessory Stacking Kit," filed Apr. 15, 2021, the entirety of which is incorporated herein by reference.

FIELD OF TECHNOLOGY

The present technology relates to stacking assemblies and accessory stacking kits.

BACKGROUND

Off-road vehicles, such as snowmobiles, ATVs, and the like, are used for both utility and recreational purposes. These vehicles sometimes carry cargo, including for example, winter weather gear, sports equipment, and the like. In some cases, it can also be desirable to transport a supplemental fuel container.

In situations where multiple cargo transport accessories are being transported in a stacked arrangement, heavier accessories or containers are generally at the bottom of a stack. In some cases, this could include supplemental fuel containers. Some cargo transport accessories, including some fuel containers, are configured to be stacked and connected directly together to facilitate transporting many such accessories.

When one accessory is to be accessed, however, any containers or accessories connected to or stacked thereon will generally need to be removed. In order to use the supplemental fuel in the fuel container, for example, any accessories connected thereto would need to be removed. When reinstalling the removed accessory, any accessories stacked thereon would similarly need to be reconnected.

Therefore, there is a desire for a solution for off-road vehicles to provide flexibility in transporting cargo.

SUMMARY

It is an object of the present technology to ameliorate at least some of the inconveniences present in the prior art.

According to one aspect of the present technology, there is provided an accessory stacking assembly for connecting to a vehicle. The assembly includes an accessory platform for connecting an accessory thereto. The platform extends over a portion of a rear of the vehicle and forms an accessory receiving space thereunder in which another accessory can be disposed. The platform is pivotable between at least a closed position, where the two accessories are stacked vertically, and an open position where the platform is pivoted upward and rearward away from the vehicle to expose the accessory disposed in the receiving space. In this way, two accessories can be connected to the vehicle in a stacked arrangement, while not requiring the accessory disposed on top to be disconnected in order to access the lower accessory. If the accessory disposed underneath is to be accessed or removed, the platform and the accessory connected thereto is simply pivoted out of the way.

According to one aspect of the present technology, there is provided a stacking assembly for connecting to a vehicle. The stacking assembly includes an accessory platform including a platform body arranged and configured to receive an accessory on a top surface of the platform body, at least one attachment device connected to the platform body, and a connection portion configured for connecting to a bumper of the vehicle, the platform body being pivotally connected to the connection portion; and at least one attachment fixture for selectively receiving the at least one attachment device, the at least one attachment fixture being configured for connecting to the vehicle, the stacking assembly being configured such that when the stacking assembly is installed on the vehicle: the connection portion being connected to the bumper of the vehicle, the at least one attachment fixture being connected to the bumper, the platform body being pivotable relative to the bumper when the at least one attachment device is separated from the at least one attachment fixture, and when the at least one attachment device is received in and secured to the at least one attachment fixture, the platform body being secured to the vehicle to prevent pivoting of the platform body.

In some embodiments, the stacking assembly is configured such that when the assembly is installed on the vehicle: in a first position, the platform body is arranged generally horizontally and extends over at least a portion of a rear area of the vehicle; and in a second position, the platform body is pivoted up and away from horizontal such that the portion of the rear area is at least partially revealed.

In some embodiments, a bottom surface of the platform body has a generally inverted U-shaped cross-section; and the stacking assembly is configured such that when the assembly is installed on the vehicle: an accessory receiving space is formed between a top surface of the portion of the rear area and the bottom surface of the platform body, the accessory receiving space is configured to receive an other accessory therein, and the accessory receiving space is open to permit introduction or removal of the other accessory in the accessory receiving space when the platform body is in the second position.

In some embodiments, the connection portion is pivotally connected to a rear portion of the platform body; and the stacking assembly is configured such that when the assembly is installed on the vehicle, the connection portion is connected to a rear portion of the bumper, and a front end of the platform body pivots upward and rearward when pivoting between the first position and the second position.

In some embodiments, the at least one attachment device is connected to a forward portion of the platform body; the stacking assembly is configured such that when the assembly is installed on the vehicle, the at least one attachment fixture is connected to a forward portion of the bumper.

In some embodiments, the at least one attachment device is received in the at least one attachment fixture when the platform body is in the first position.

In some embodiments, the stacking assembly is configured such that when the assembly is installed on the vehicle and the accessory is connected to the platform body, the platform body is configured to pivot between the first position and the second position with the accessory connected to the platform body.

In some embodiments, the top surface of the platform body defines at least one aperture therein configured to receive at least one accessory attachment device of the accessory therein for selectively connecting the accessory to the platform body.

In some embodiments, the at least one aperture is a plurality of apertures; the at least one accessory attachment device is a plurality of accessory attachment devices; and each aperture of the plurality of apertures is configured to receive a corresponding attachment device of the plurality of attachment devices.

In some embodiments, the at least one accessory attachment device of the accessory includes at least one anchor; the at least one anchor of the accessory includes a fastener portion; and the at least one aperture in the top surface is configured to receive the fastener portion of the at least one anchor.

In some embodiments, the at least one aperture in the top surface is formed in at least one of a right side portion and a left side portion of the top surface; and the at least one aperture is sized and arranged for receiving at least one securing strap element for securing the accessory to the platform body.

In some embodiments, the connection portion comprises a bracket.

In some embodiments, the bracket is pivotally connected to the platform body by a hinge.

In some embodiments, the connection portion defines a plurality of holes therein for receiving fasteners for connecting the connection portion to the bumper.

In some embodiments, the plurality of holes of the connection portion for receiving fasteners for connecting to the bumper is a first plurality of holes; and the connection portion defines a second plurality of holes therein for receiving fasteners for connecting the connection portion to a rear portion of the vehicle.

In some embodiments, the vehicle is a snowmobile including a tunnel; and the stacking assembly is configured such that when the assembly is installed on the vehicle: the connection portion is fastened to the bumper by at least one first fastener extending through at least one of the first plurality of holes, and the connection portion is fastened to a rear side of the tunnel by at least one second fastener extending through at least one of the second plurality of holes.

In some embodiments, the at least one attachment device is at least one anchor connected to the platform body; the at least one anchor includes a fastener portion rotatable relative to the platform body; the at least one attachment fixture includes at least one anchor fixture; the at least one anchor fixture defines an opening and an anchor chamber therein; and the opening and the anchor chamber of the at least one anchor fixture are sized and arranged to selectively receive the fastener portion of the at least one anchor therein.

In some embodiments, the at least one attachment fixture is configured for connecting to the bumper.

In some embodiments, the at least one attachment device includes: a first attachment device connected to a forward portion of a right side of the platform body, and a second attachment device connected to a forward portion of a left side of the platform body; and the at least one attachment fixture includes: a first attachment fixture for connecting to a right side of the bumper, and a second attachment fixture for connecting to a left side of the bumper.

In some embodiments, the at least one attachment fixture includes an L-shaped bracket defining at least one hole for receiving at least one fastener for connecting the at least attachment fixture to the bumper; and an anchor fixture connected to the L-shaped bracket.

In some embodiments, a bottom surface of the platform body defines at least one recess therein; and the at least one recess is shaped and sized to receive a portion of an other accessory disposed under the platform body when the assembly is installed on the vehicle.

According to another aspect of the present technology, there is provided an accessory stacking kit for a vehicle. The kit includes a stacking assembly including an accessory platform including: a platform body arranged and configured to receive an accessory on a top surface of the platform body, a right anchor connected to a right side, forward portion of the platform body, a left anchor connected to a left side, forward portion of the platform body, and a connection portion pivotally connected to a rear side of the platform body, the connection portion being configured for connecting to a bumper of the vehicle; a right side anchor fixture for selectively receiving the right anchor, the right side anchor fixture being configured for connecting to a right side portion of the bumper; and a left side anchor fixture for selectively receiving the left anchor, the left side anchor fixture being configured for connecting to a left side portion of the bumper.

In some embodiments, the kit further includes a plurality of fasteners for connecting the connection portion, the right side anchor fixture, and the left side anchor fixture to the vehicle.

For purposes of the present application, terms related to spatial orientation of elements described herein, such as "left", "right", "top", "bottom", "upper", "lower" "above" and "below", are as they would normally be understood by a driver of the vehicle sitting thereon in a normal riding position.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

The present technology of an accessory stacking assembly 100 will be described with reference to a snowmobile 40 having a tunnel 50, but it is contemplated that the present technology could also be applicable to all-terrain vehicles (ATVs), and other vehicles transporting accessory cargo containers. It is noted that particulars of the snowmobile 40 beyond the tunnel 50 are outside the scope of the present description and therefore will not be further detailed. One non-limiting example of a construction of a snowmobile to which the present technology could be connected may be found in U.S. Pat. No. 10,744,953, issued on Aug. 18, 2020, the entirety of which is incorporated herein by reference.

Figure 13:
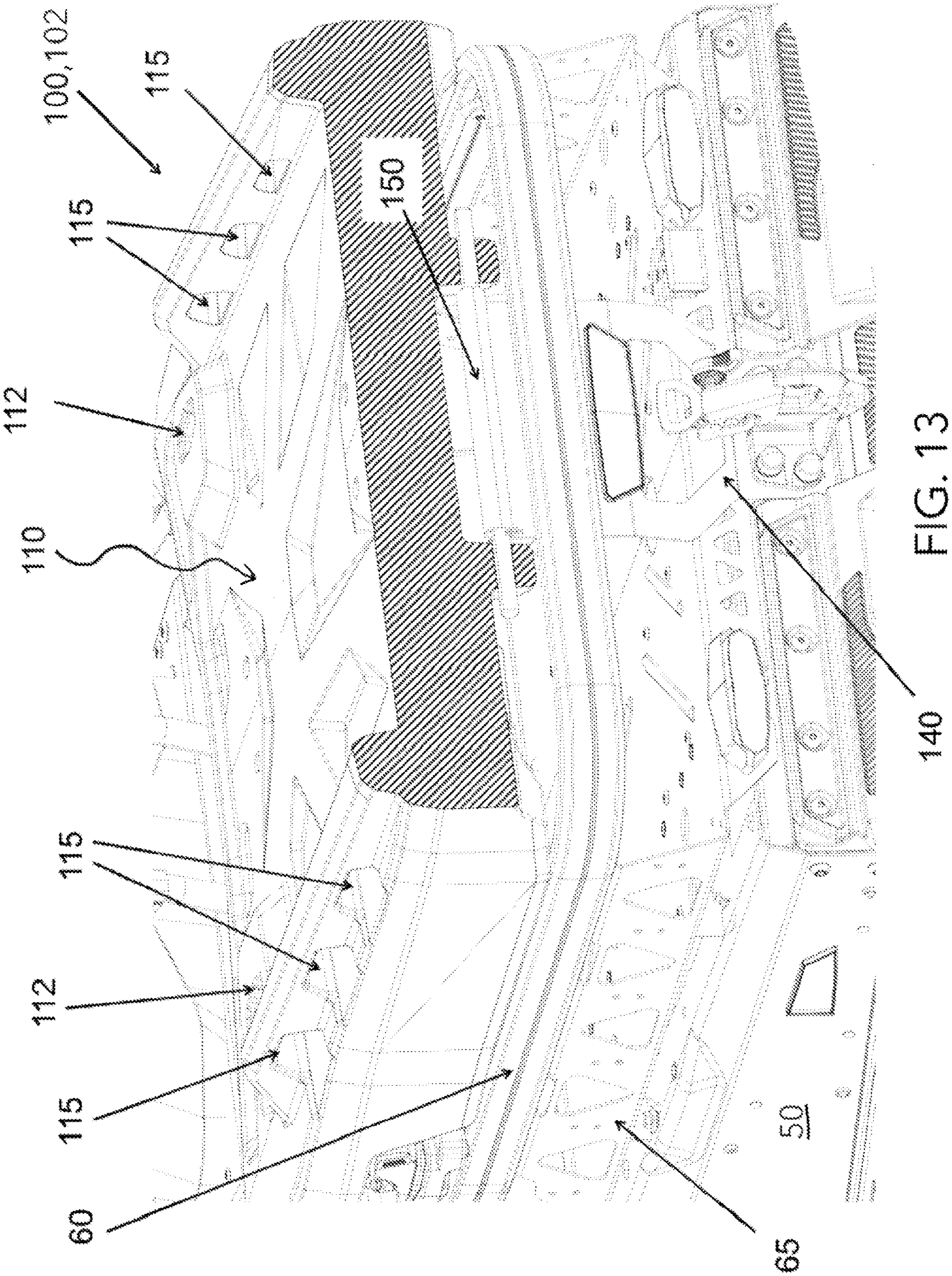
FIG. 13 is a cross-sectional, rear, left side perspective view of the snowmobile and the stacking assembly of FIG. 1.
Figure 14:
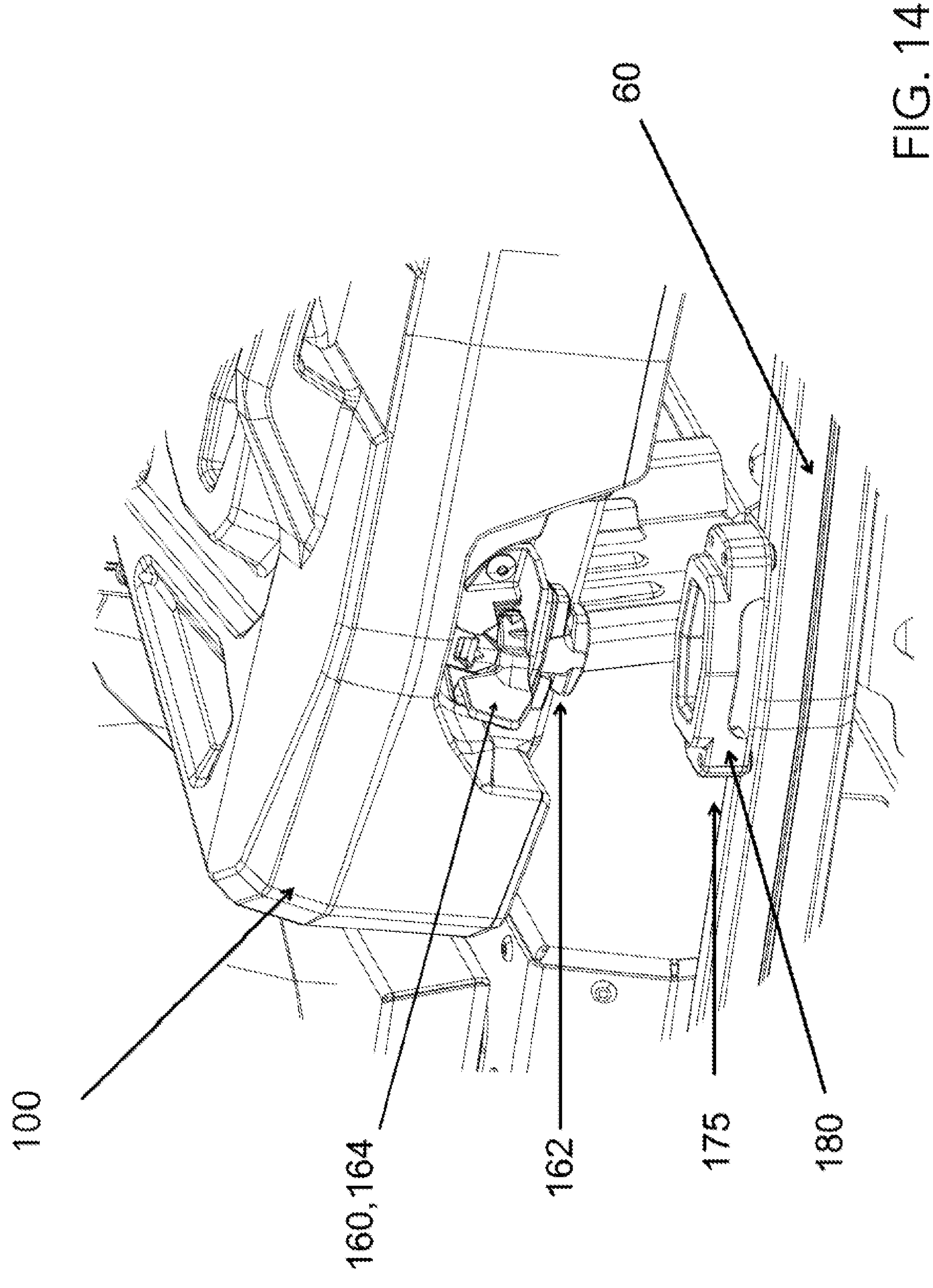
FIG. 14 is a close-up, partial view of the snowmobile and the stacking assembly of FIG. 1.

The accessory stacking assembly 100, also referred to herein as the stacking assembly 100 or the assembly 100, is illustrated connected to the snowmobile 40 in FIGS. 1 to 6. As will be described in more detail below, the assembly 100 is specifically fastened to a bumper 60 of the snowmobile 40, as well as a rear portion of the tunnel 50 (see also FIG. 13). In the illustrated embodiment of the snowmobile 40, the bumper 60 is connected to the tunnel 50 by a bumper support bracket 65. In some embodiments, it is contemplated that the support bracket 65 and/or the bumper 60 could be provided with the assembly 100 for connecting to the snowmobile 40.

Figure 3:
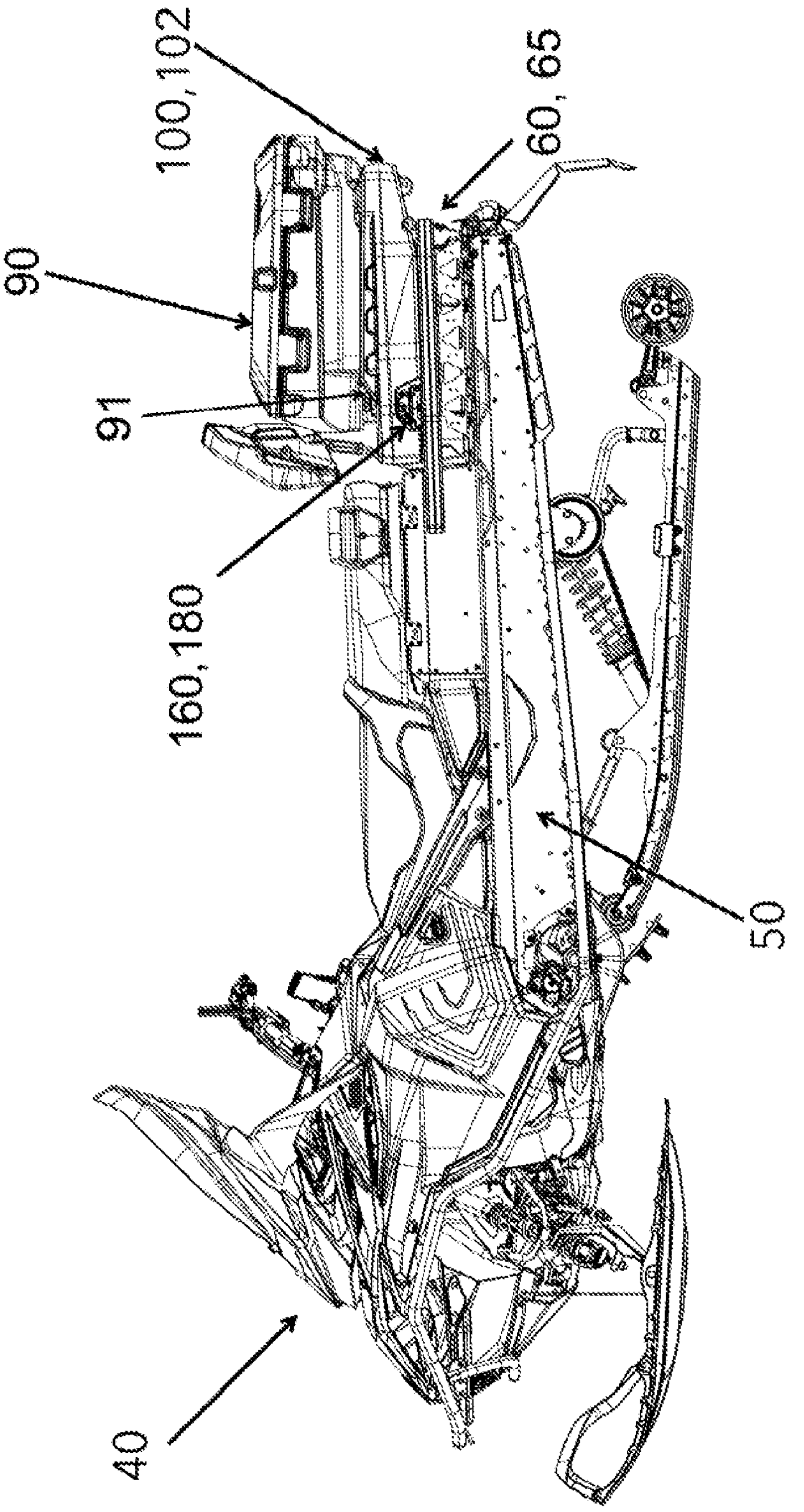
FIG. 3 is the left side elevation view of the snowmobile and the stacking assembly of FIG. 1, with the stacking assembly in the closed position and an accessory connected to the assembly.
Figure 4:
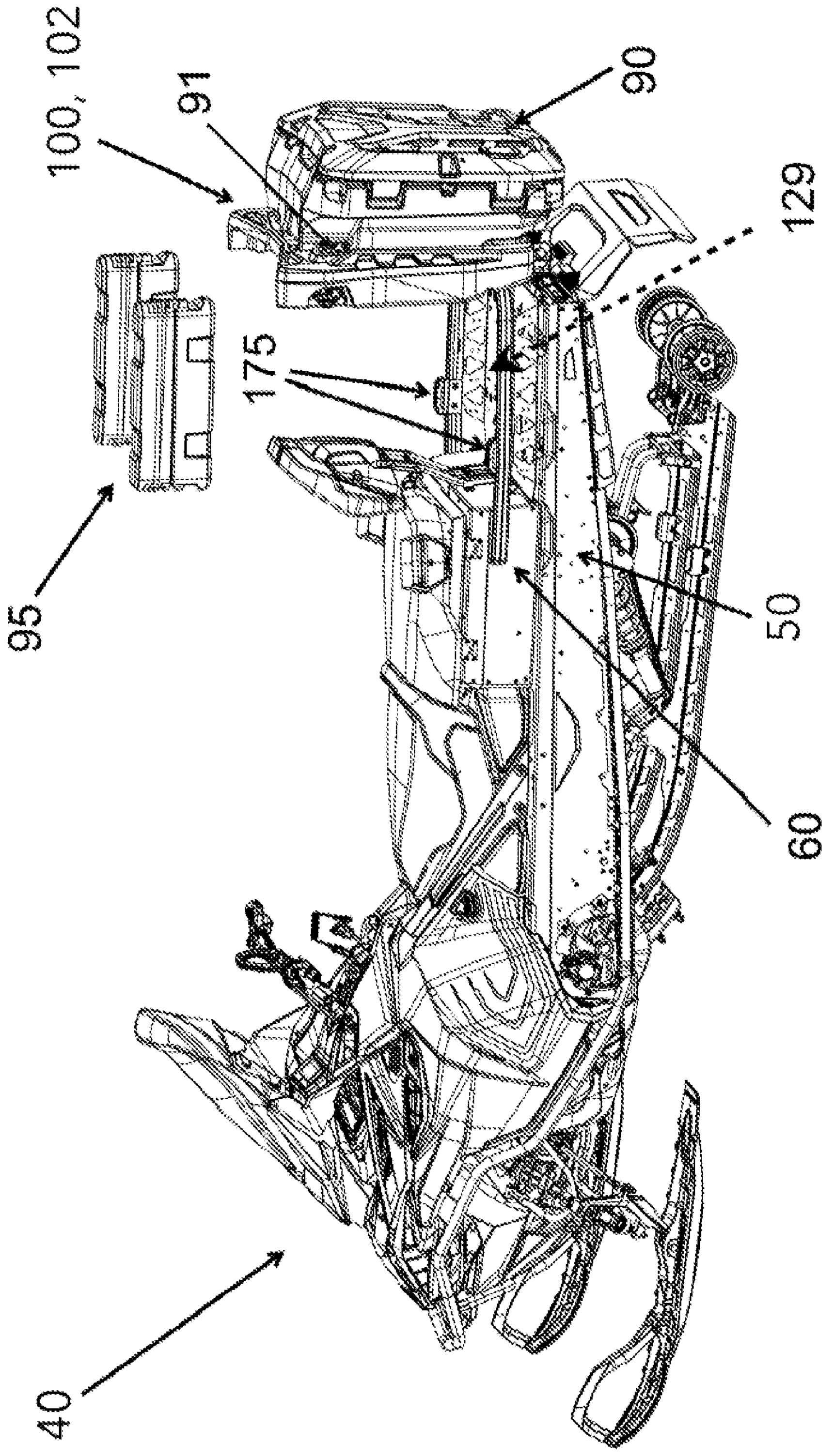
FIG. 4 is a rear, left side perspective view of the snowmobile, the stacking assembly, and the accessory of FIG. 3, with the assembly in the open position.
Figure 5:
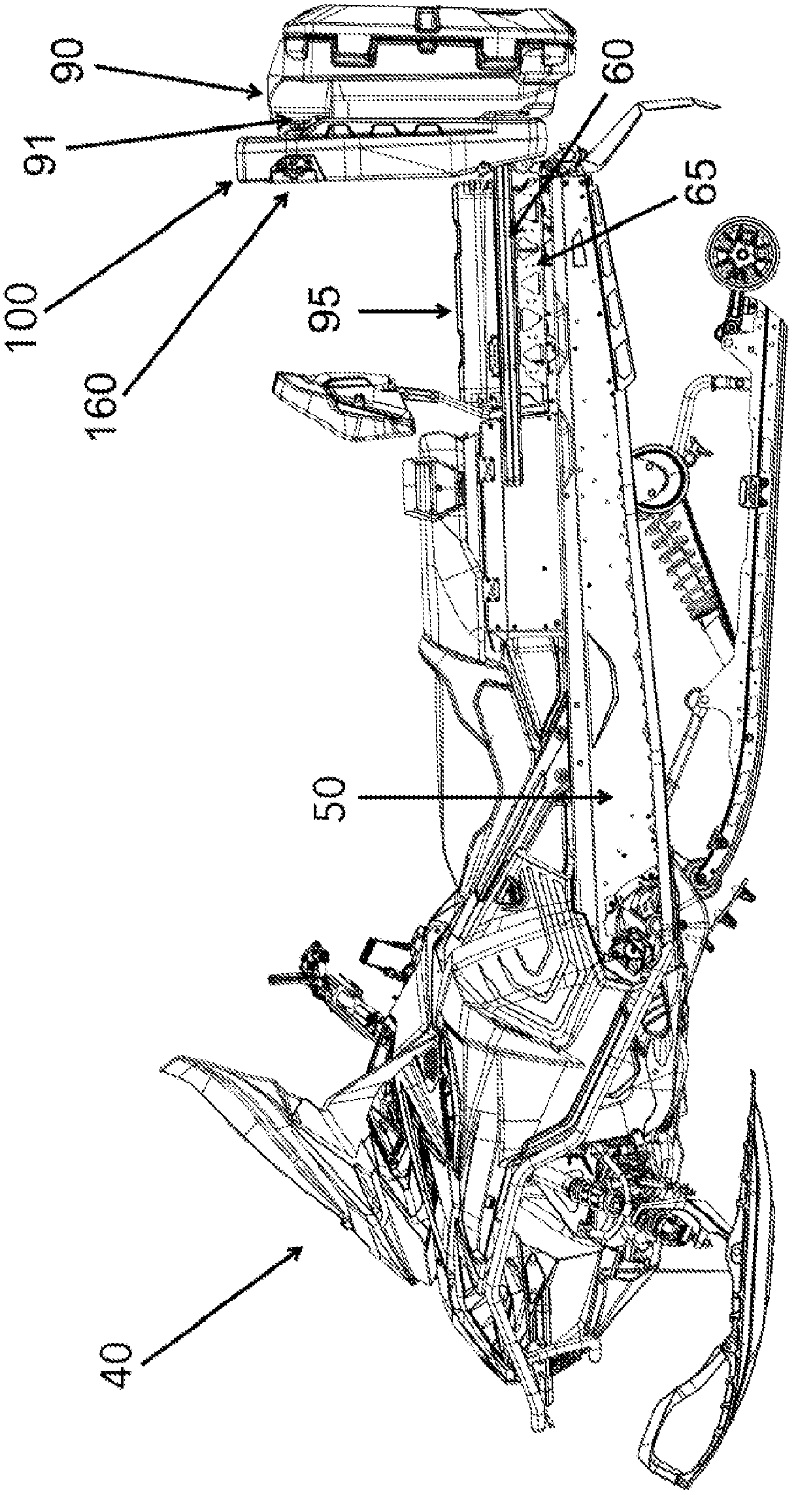
FIG. 5 is the left side elevation view of the snowmobile, the stacking assembly, and the accessory of FIG. 3, with the assembly in the open position.

The assembly 100 is arranged, as will be described in detail below, to secure one or more accessories to the snowmobile 40. The accessories could include a variety of objects, including but not limited to: boxes, bags, fuel containers, and tools. As one non-limiting example, the assembly 100 is illustrated in FIGS. 3 to 5 with a snowmobile cargo box 90 connected thereto. As can be seen in FIGS. 4 and 5 and as will be described in more detail below, the box accessory 90 is not required to be disconnected from the assembly 100 (and thus need not be disconnected from the snowmobile 40) in order to access an accessory receiving space 129 below the box 90 and the assembly 100, where an additional accessory 95 can be stored (see FIGS. 2, 4, and 5).

With additional reference to FIGS. 7 to 12, components of the accessory stacking assembly 100 will be described in more detail; operation of the assembly 100 will be described further below. The accessory stacking assembly 100 includes an accessory platform 102 for pivotally connecting to a vehicle, such as the snowmobile 40, and two attachment fixtures 175 for connecting to the vehicle. As will be described further below, the accessory platform 102 selectively connects to the attachment fixtures 175 to prevent pivoting of the accessory platform 102.

The accessory platform 102 is formed from a platform body 105, a connection portion 140, and two attachment devices 160.

Figure 6:
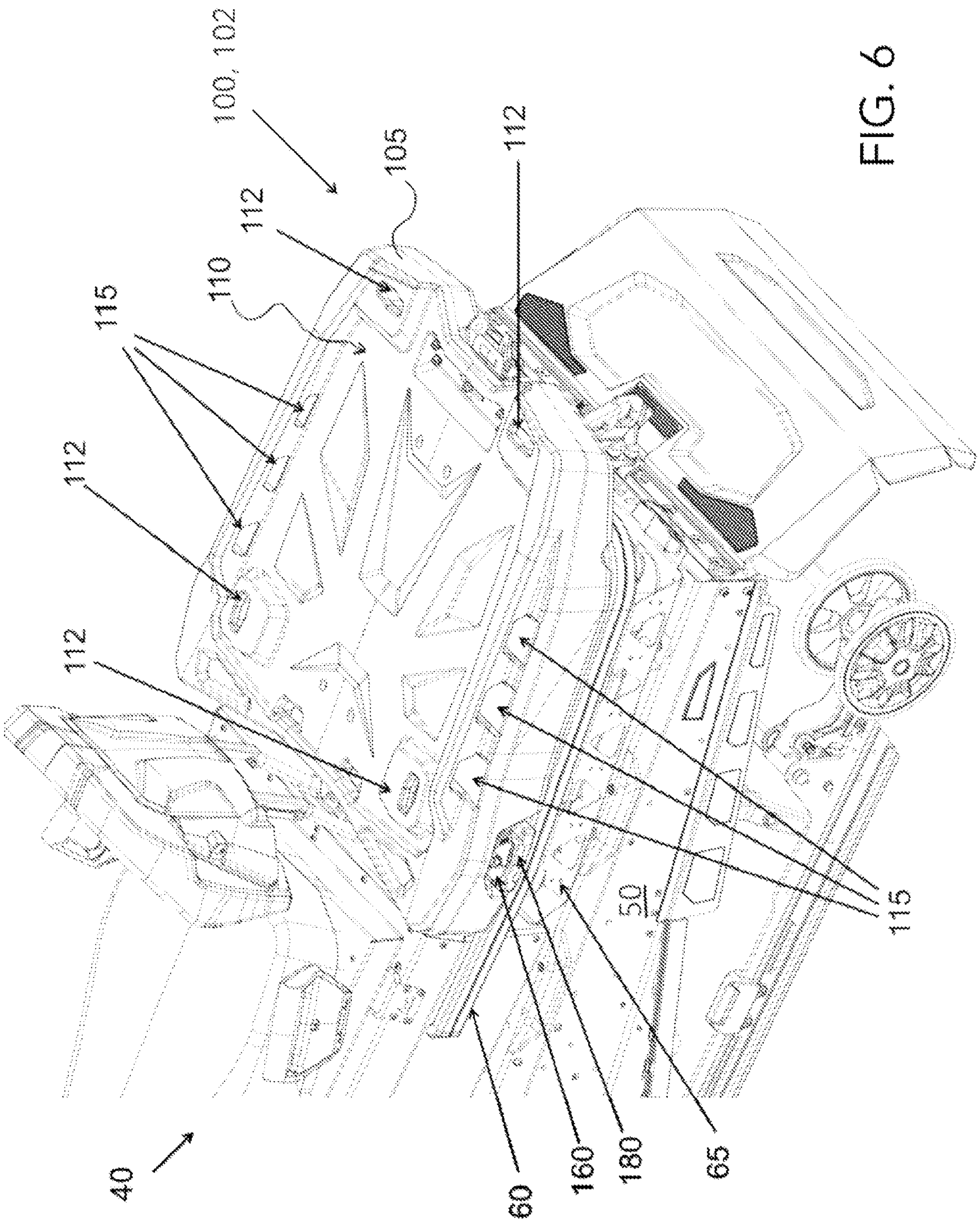
FIG. 6 is a close-up, left, rear side perspective view of the snowmobile and the stacking assembly of FIG. 1.

The platform body 105 includes a top surface 110 arranged and configured to receive the accessory 90. The top surface 110 is formed to receive one or more attachment devices from the accessory 90, for example, or from different embodiments of accessories connected thereto. As is illustrated in FIG. 6, the top surface 110 forms therein four apertures 112 configured to receive an accessory attachment device of an accessory therein for selectively connecting the accessory to the platform body 105. The accessory 90 includes two anchors 91 (only one anchor 91 being shown in the Figures) which connect, at least in part, the accessory 90 to the platform body 105. As will described in greater detail below, the anchor 91 includes a fastener portion for selectively inserting into and rotating within a corresponding aperture 112 for maintaining the anchor 91 in place.

The apertures 112, configured to receive the fastener portion in the top surface 110, are formed in right and left forward portions and right and left rear portions of the top surface 110. It is contemplated that the apertures 112 could be formed in different positions in the platform body 105. Depending on the embodiment, there could be more or fewer apertures 112, including in some cases only one aperture 112 or omitting the apertures 112 altogether.

The platform body 105 also includes side apertures 115 sized and arranged for receiving one or more securing strap elements for securing an accessory to the platform body 105. Depending on the accessory, the securing strap elements could include, but are not limited to ropes, ratchet straps, and bungee cords. The side apertures 115 are formed in raised right and left side portions of the top surface 110, although it is contemplated that the apertures 115 could be differently configured and arranged. It is also contemplated that more or fewer apertures 115 could be formed by the platform body 105, including omitting the apertures 115 in some cases.

Figure 7:
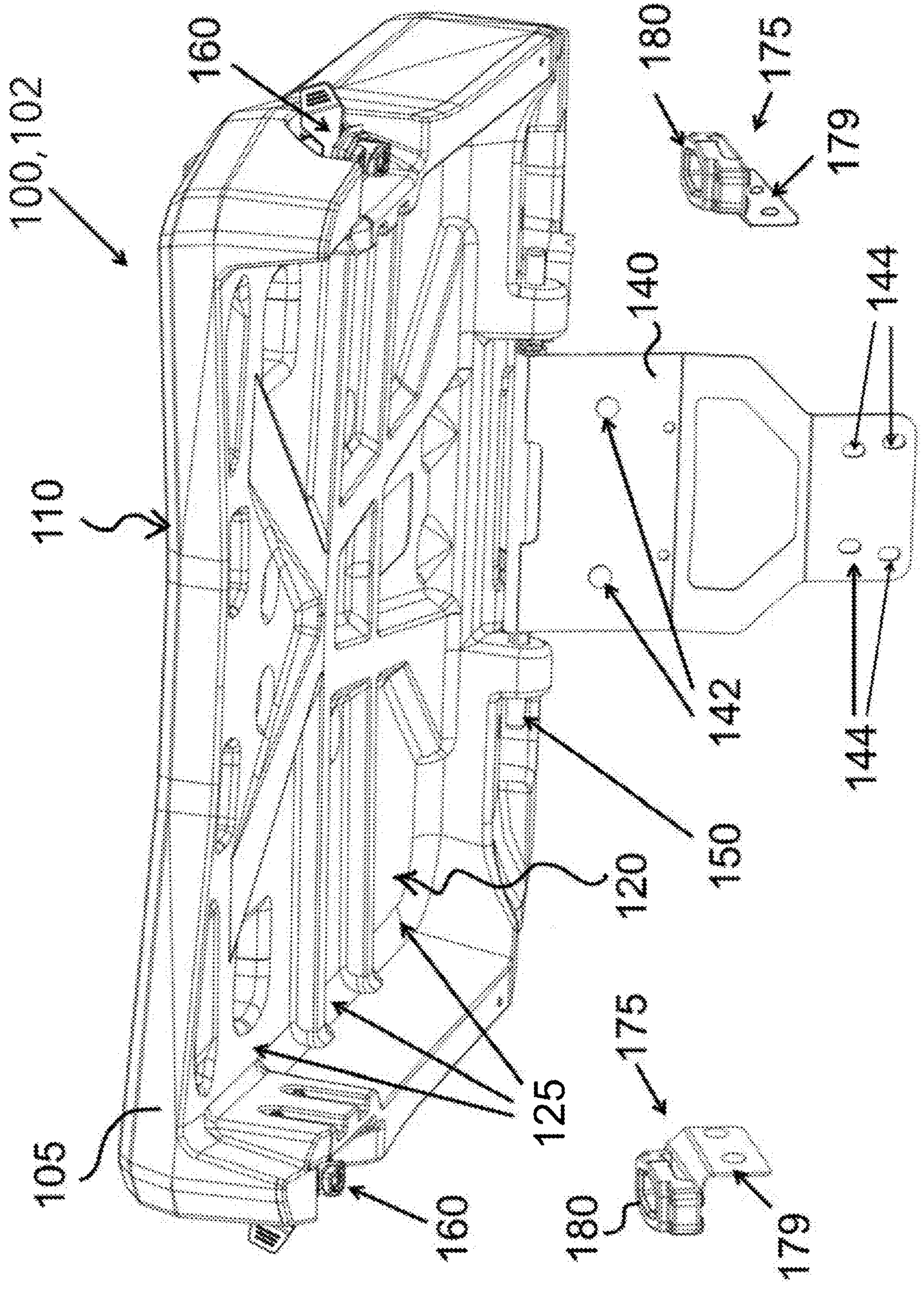
FIG. 7 is a front, left side perspective view of the stacking assembly of FIG. 1.
Figure 8:
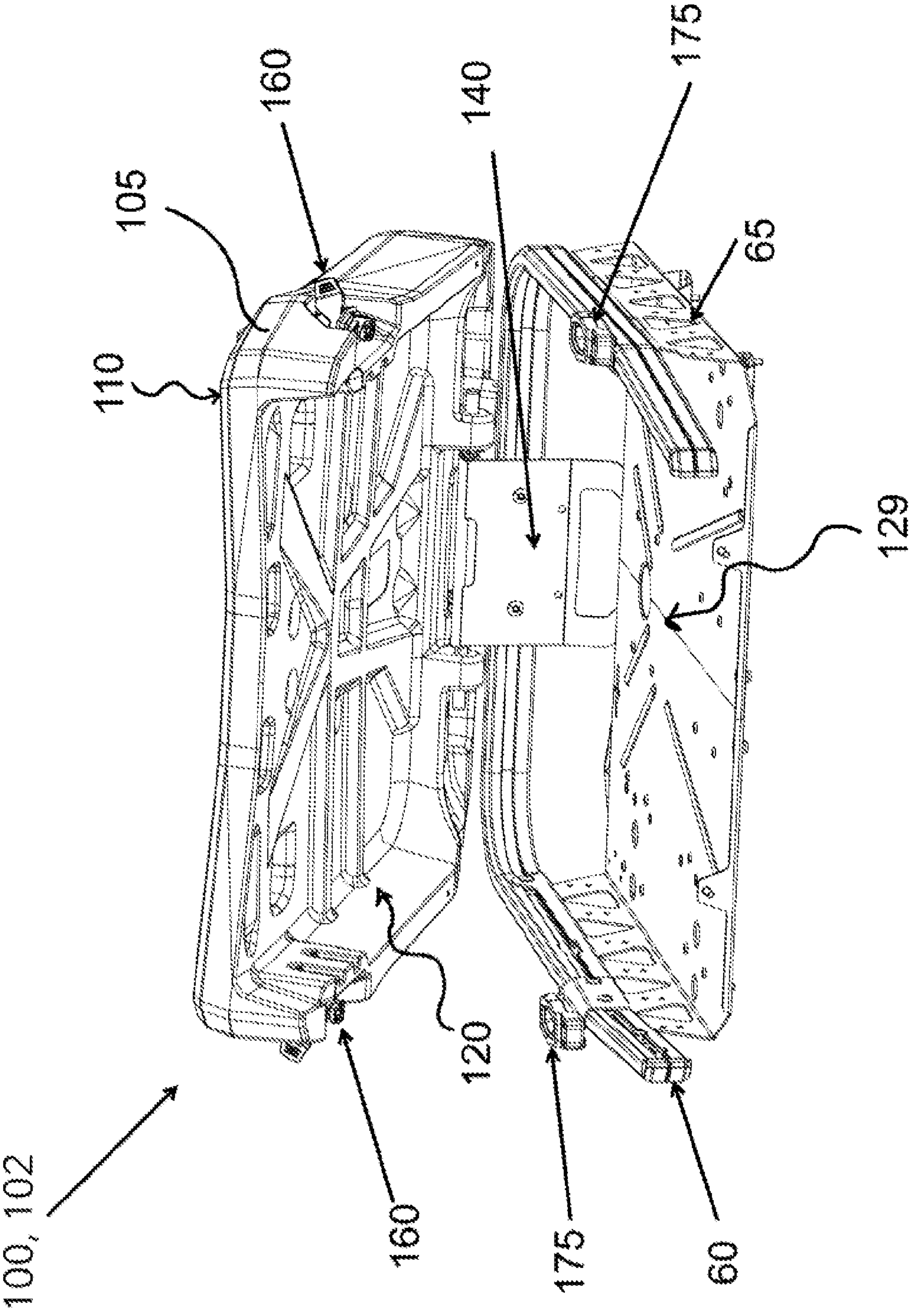
FIG. 8 is the front, left side perspective view of the stacking assembly of FIG. 7, with a bumper and a bumper support bracket of the snowmobile.
Figure 9:
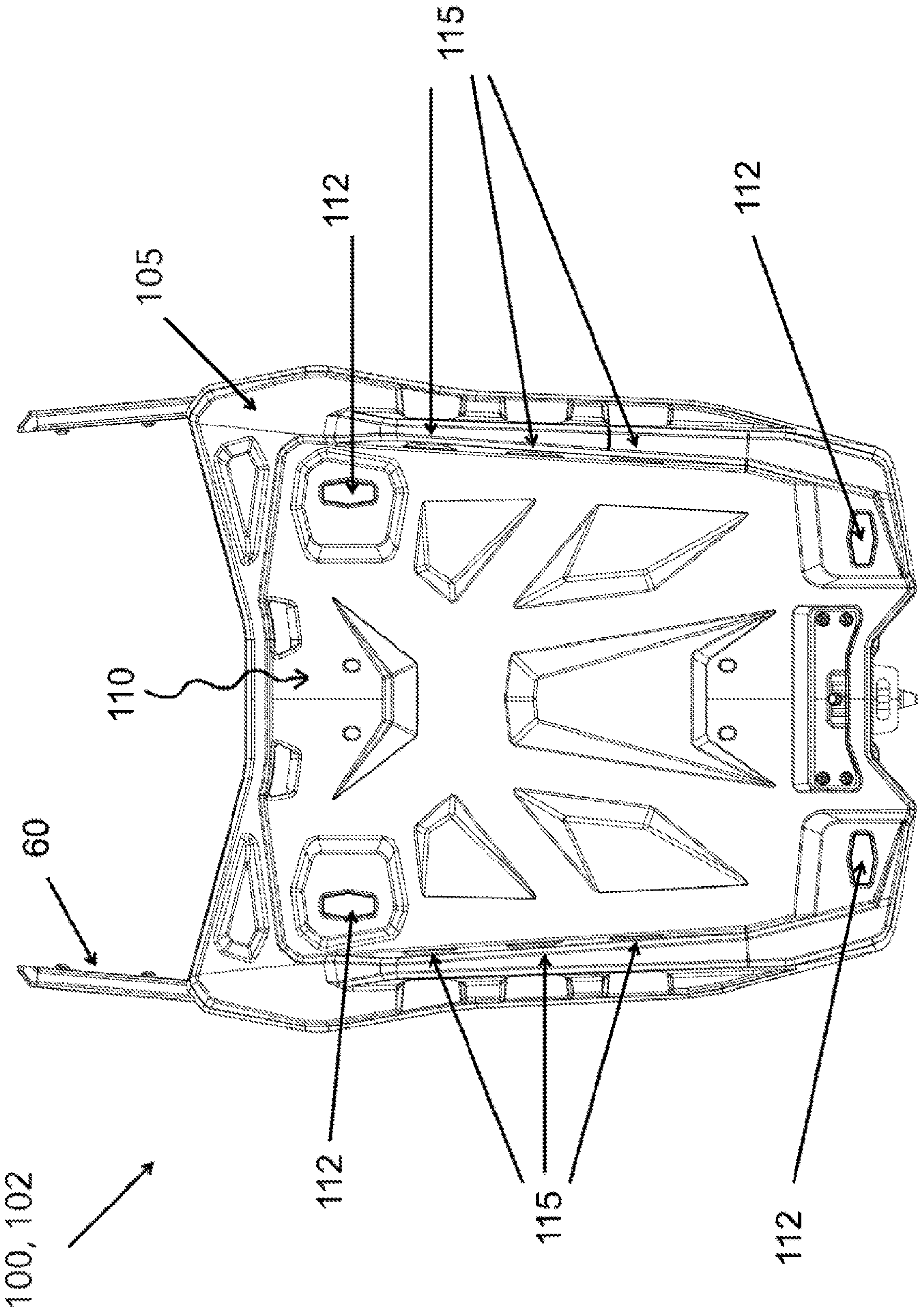
FIG. 9 is a top plan view of the stacking assembly and the bumper of FIG. 8.
Figure 10:
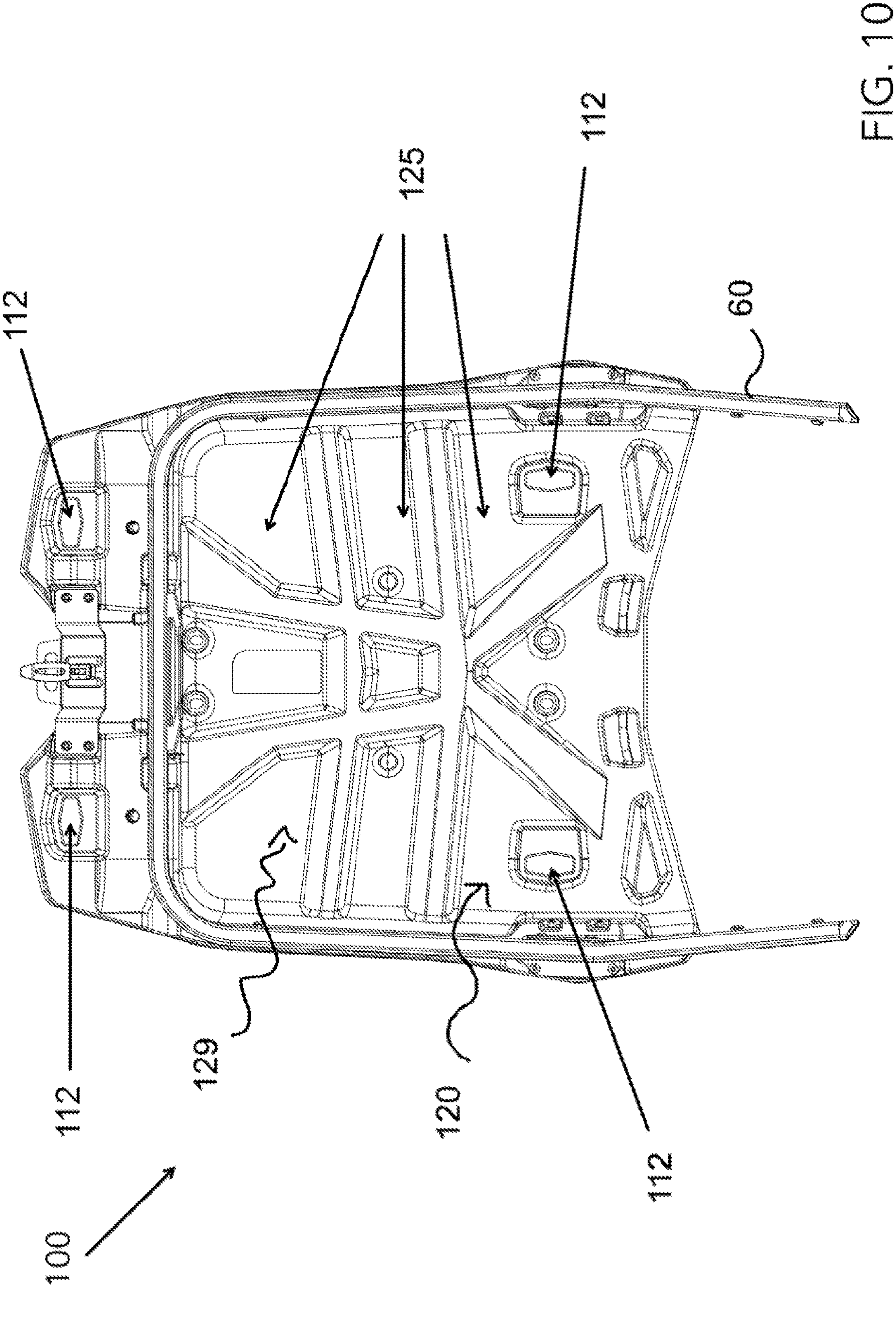
FIG. 10 is a bottom plan view of the stacking assembly and the bumper of FIG. 8.
Figure 11:
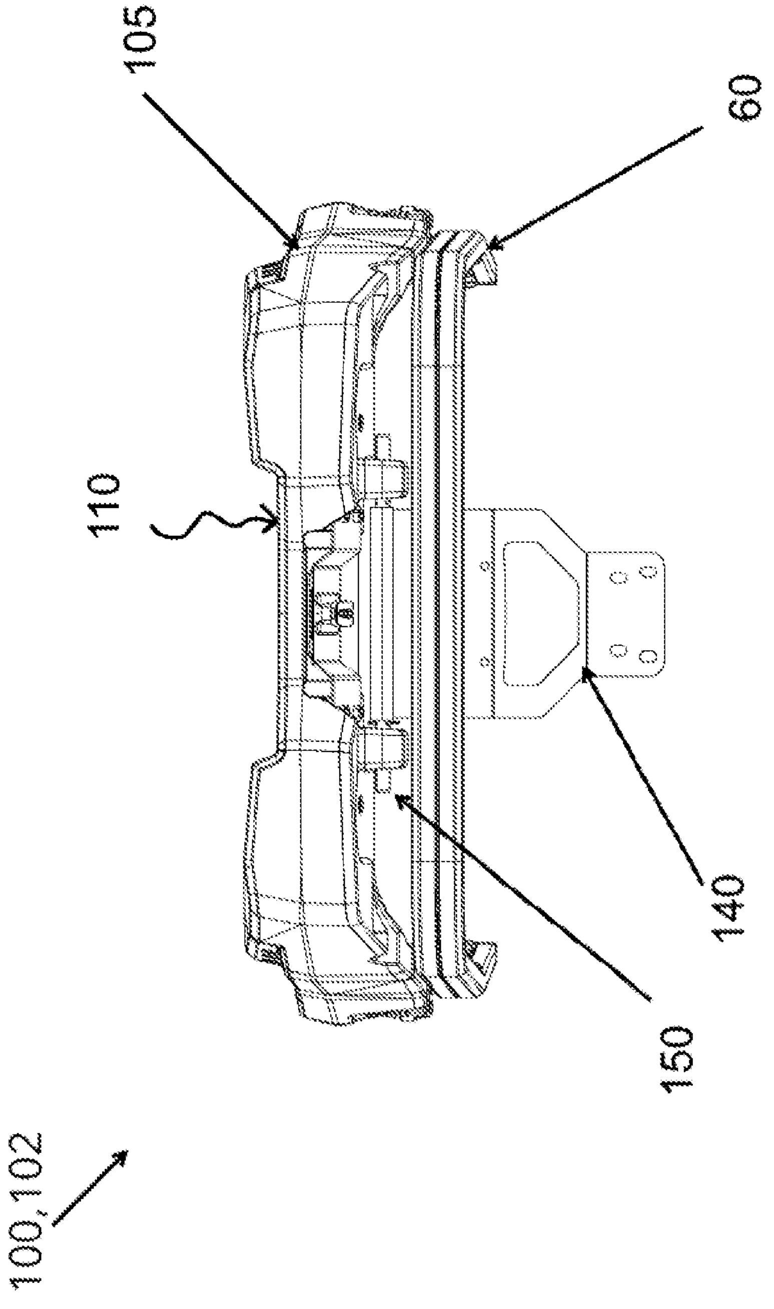
FIG. 11 is a rear side elevation view of the stacking assembly and the bumper of FIG. 8.
Figure 12:
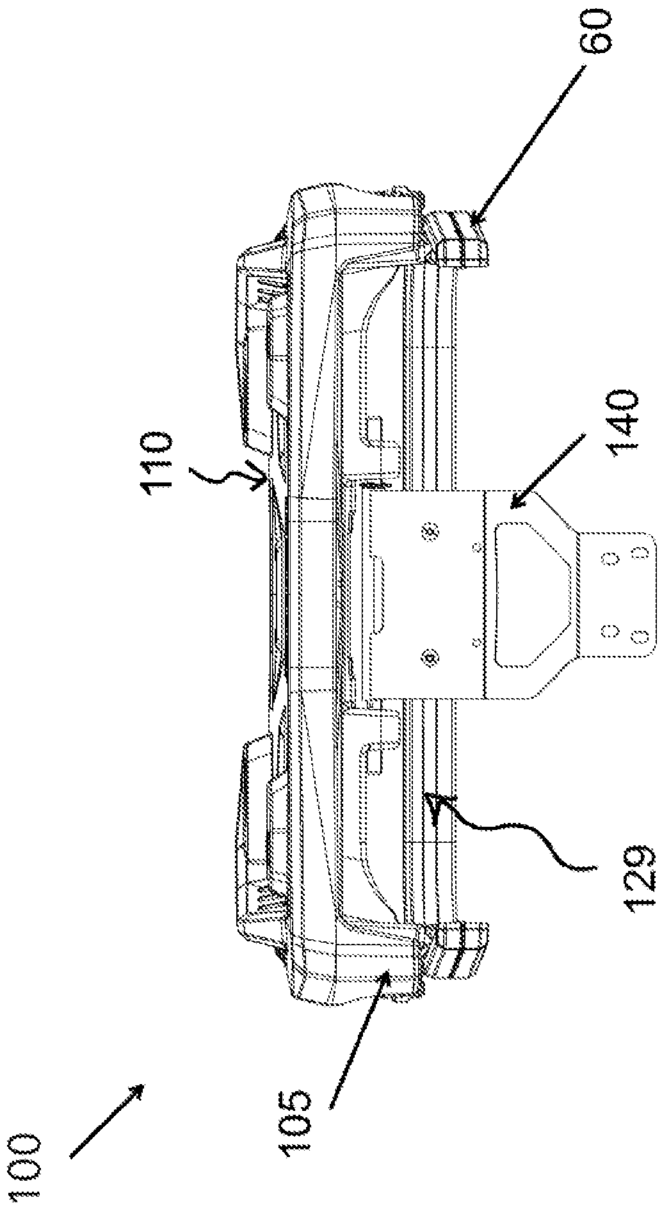
FIG. 12 is a front side elevation view of the stacking assembly and the bumper of FIG. 8.

As can best be seen in FIGS. 7, 8, and 10, the platform body 105 has a bottom surface 120, disposed opposite the top surface 110. The bottom surface 120 has a generally inverted U-shaped cross-section in order to provide space below the platform body 105 for receiving objects below the platform body 105, such as the accessory 95. With this form of the underside of the platform body 105, the assembly 100 is configured such that, when the assembly 100 is installed on the snowmobile 40, the accessory receiving space 129 is formed between a portion of the top surface of the rear area of the tunnel 50 and the bottom surface 120 of the platform body 105. The accessory receiving space 129 is configured to receive another accessory therein, such as the accessory 95 illustrated in the Figures.

The bottom surface 120 of the platform body 105 defines a plurality of recesses 125 therein. Each recess 125 is shaped and sized to receive therein a portion of an accessory disposed under the platform body 105 when the assembly 100 is installed on the snowmobile 40. The recesses 125 are configured to allow at least some pre-determined accessories to fit below the platform body 105, even if there are portions of the accessory that extend above the lowest portion of the bottom surface 120. For example, one of the recesses 125 could be shaped and sized to receive therein a handle of a particular accessory. The number, size, and shape of the recesses 125 could vary in different embodiments. It is also contemplated that the recesses 125 could be omitted in some embodiments.

The accessory platform 102 also includes the connection portion 140 configured for pivotally connecting the platform body 105 to the bumper 60 and the tunnel 50 in the present embodiment. In some embodiments, the connection portion 140 could connect only to the bumper 60. In some embodiments, the connection portion 140 could connect only to the tunnel 50. Specifically, the platform body 105 is pivotally connected to the connection portion 140 by a hinge arrangement 150. The specific mechanism connecting the platform body 105 and the connection portion 140 could vary in different embodiments. In the present embodiment, the connection portion 140 is a bracket 140 pivotally connected to the platform body 105 by the hinge 150. The specific form of the connection portion 140 could vary in different embodiments.

As can be seen in at least FIG. 7, the connection portion 140 defines a plurality of holes 142 therein for receiving fasteners for connecting the connection portion 140 to the bumper 60. While two holes 142 are defined in the bracket 140 in the illustrated embodiment, more or fewer holes 142 could be defined in the bracket 140 in different embodiments. The bracket 140 also defines a plurality of holes 144 therein for receiving fasteners for connecting the bracket 140 to a rear portion of the vehicle. In the illustrated embodiment, the holes 144 are arranged to connect the bracket 140 to a rear portion of the tunnel 50 of the snowmobile 40. It is contemplated that the bracket 140 could have more or fewer holes 144 for connecting to the tunnel 50. In some embodiments, the holes 144 could be omitted.

The accessory platform 102 further includes the attachment devices 160 connected to the platform body 105. In the present embodiment, the attachment devices 160 are two anchors 160 for selectively connected to corresponding anchor fixtures 180. The anchors 160, disposed in the front left and right portions of the platform body 105. It is contemplated that more or fewer anchors 160 could be included. It is also contemplated that the attachment devices 160 could be differently implemented in some embodiments. As one non-limiting example, the accessory platform 102 could include flexible or stretchable cords, with or without hooks. The anchors 160 as well as the fixtures 180 will be described in additional detail below.

With continued reference to FIG. 7, the assembly 100 also includes two attachment fixtures 175 for selectively receiving the attachment devices 160 to selectively secure the platform body 105 in the closed position. The attachment fixtures 175 are configured for connecting to a vehicle, specifically for connecting to the snowmobile bumper 60 forward of the connection portion 140 in the present embodiment. The assembly 100 includes one fixture 175 for connecting to the right side of the bumper 60 and selectively receiving the right side anchor 160 and one fixture 175 for connecting to the left side of the bumper 60 and selectively receiving the left side anchor 160. In some cases, the assembly 100 could include more or fewer fixtures 175. It is contemplated that in some embodiments of the vehicle to which the assembly 100 is connected, the bumper 60 or another portion of the vehicle could include apertures for receiving the anchors 160. In such a case, the fixtures 175 could be optionally omitted.

Each attachment fixture 175 includes an L-shaped bracket 179 and an anchor fixture 180 connected to the L-shaped bracket 179. The anchor fixture 180 is described in more detail below. The bracket 179 defines a plurality of through-holes in a generally vertical portion thereof for receiving at least one fastener for connecting the attachment fixture 175 to the bumper 60. The anchor fixture 180 is also fastened to the bracket 179, using through-holes in a generally horizontal portion of the bracket 179. In some embodiments, it is contemplated that the anchor fixture 180 and the bracket 179 could be different connected (for example by glue or welding) or could be integrally connected.

Figure 15:
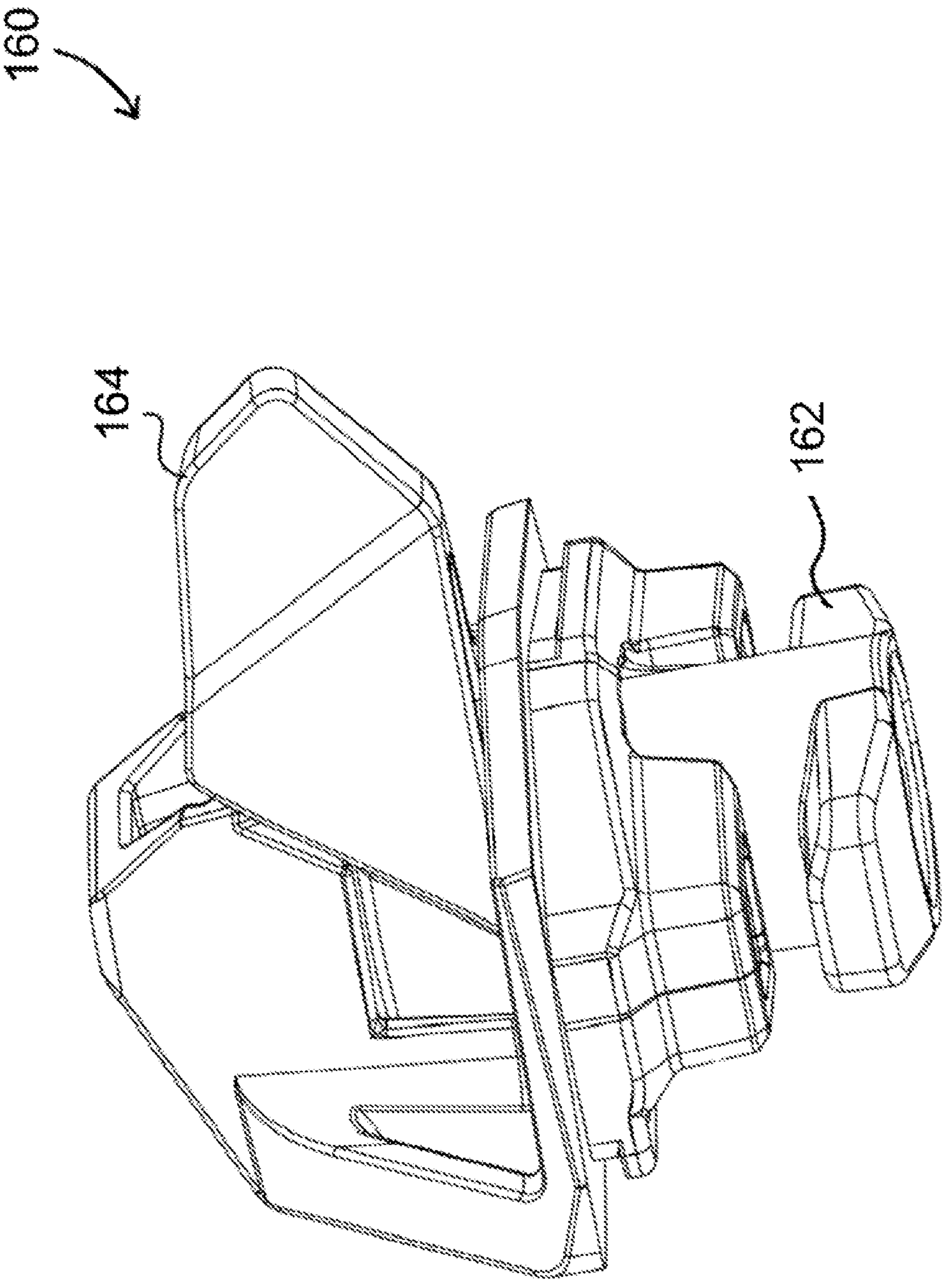
FIG. 15 is a perspective view of an anchor of the stacking assembly of FIG. 1.
Figure 16:
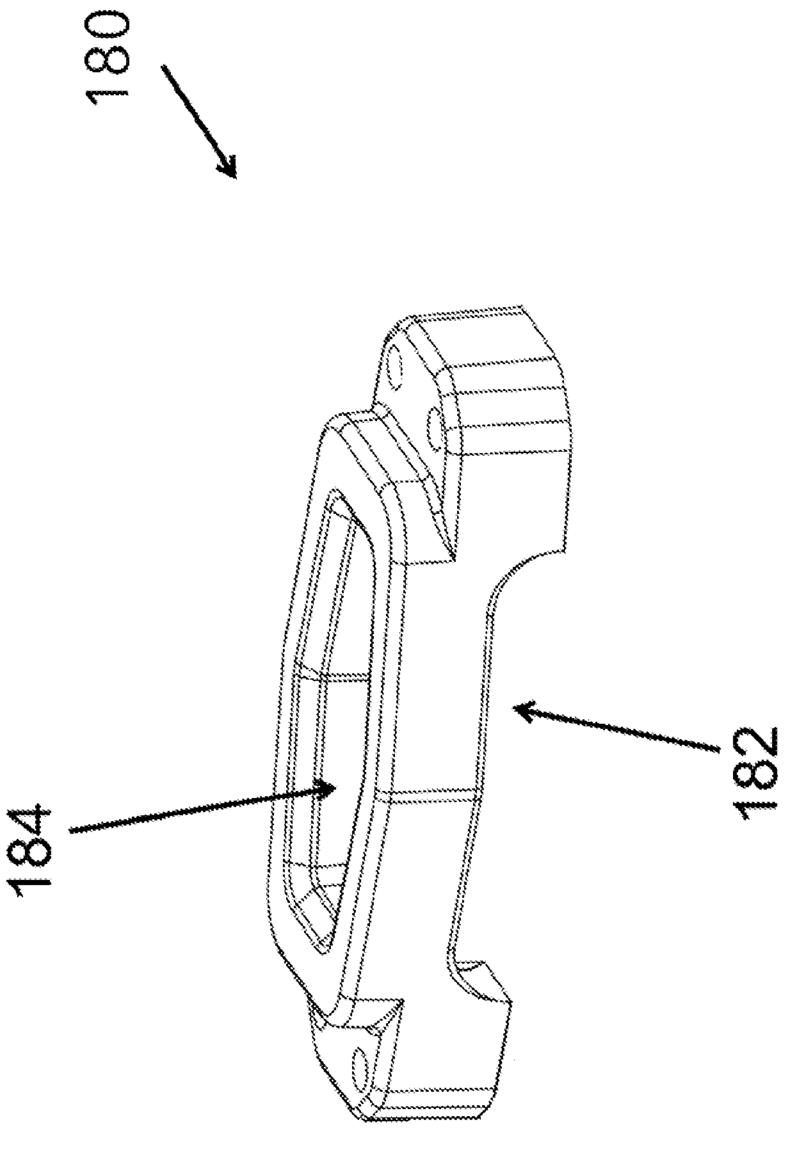
FIG. 16 is a perspective view of an anchor fixture of the stacking assembly of FIG. 1.

With reference to FIGS. 15 and 16, the accessory anchors 160 and the anchor fixtures 180 will be described. It is noted that the anchors 91 are generally the identical to the anchors 160 in the present embodiment, although that may not always be the case. Anchors and anchor fixtures of this type are described in detail in U.S. Pat. No. 9,751,592, issued on Sep. 5, 2017, as well as U.S. Pat. No. 9,511,704, issued on Dec. 6, 2016, the entirety of each of which is incorporated herein by reference. Only a brief description of the anchors 160 and anchor fixtures 180 will therefore be provided herein.

Each anchor 160 has a fastener portion 162 and an actuator portion 164 operatively connected to the fastener portion 162. The fastener portion 162 is configured to be received in an anchor chamber 182 defined in part by the corresponding anchor fixture 180. The fastener portion 162 is movable between locked and unlocked positions. Notably, the actuator portion 164 is movable by a user to move the fastener portion 162 between the locked and unlocked positions thereof.

The fastener portion 162 is shaped such that, when the fastener portion 162 is received in the anchor chamber 182 defined by the corresponding anchor fixture 180, in the unlocked position, the fastener portion 162 is removable from the anchor fixture 180. Notably, an opening 184 of the anchor fixture 180, which opens into the anchor chamber 182, has a hexagonal shape which allows the similarly hexagonally-shaped fastener portion 162 to be removed therethrough in the unlocked position. Similarly, the fastener portion 162 is insertable into the anchor chamber 182 of the anchor fixture 180 in the unlocked position. Conversely, when the fastener portion 162 is received in the anchor chamber 182, in the locked position, the fastener portion 162 is retained by the anchor fixture 180 connected to the snowmobile 40 as the fastener portion 162 is not aligned with the opening 184 of the anchor fixture 180 and therefore cannot be removed therethrough. It is also noted that the apertures 112 in the top surface 110 of the platform body 105 are hexagonally shaped, similarly to the opening 184, in order to selectively receive and secure therein the fastener portion 162 of an anchor 160 connected to an accessory to be connected to the assembly 100.

Having described the components of the assembly 100, operation of the assembly 100 will now be described in more detail. As is illustrated in at least FIGS. 1 to 5, the stacking assembly 100 is configured such that, when the assembly 100 is installed on the snowmobile 40, the platform body 105 is pivotable between at least two positions relative to the snowmobile 40 (when the anchors 160 are not secured to the corresponding fixtures 180). While only two positions, closed and open, are described herein, the platform body 105 is generally movable to and through a plurality of intermediate positions.

In a closed position, the platform body 105 is arranged generally horizontally and extends over at least a portion of the tunnel 50 (see FIGS. 1, 3 6, and 13). In the closed position, the anchors 160 are received in the attachment fixtures 175. When the fastener portion 162 is moved to the locked position such that the anchor 160 is secured to the fixture 180, the platform body 105 is selectively secured to the snowmobile 40 to prevent pivoting of the platform body 105. By securing the platform body 105 using the anchors 160, the assembly 100 and the accessory 90 is connected thereto are impeded from moving or pivoting during operation of the snowmobile 40 for example.

Figure 1:
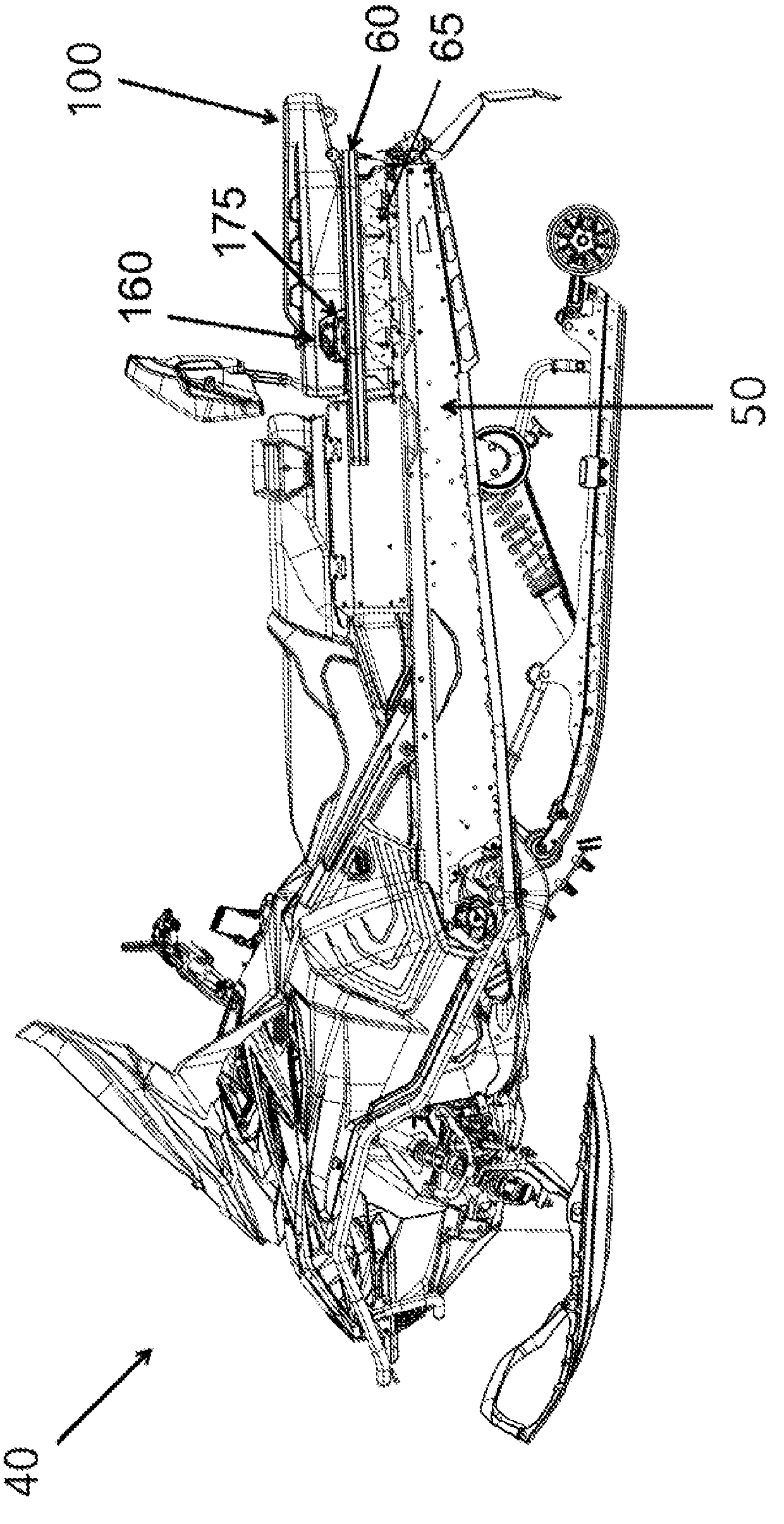
FIG. 1 is a left side elevation view of a snowmobile and a stacking assembly connected thereto, with the stacking accessory in a closed position.
Figure 2:
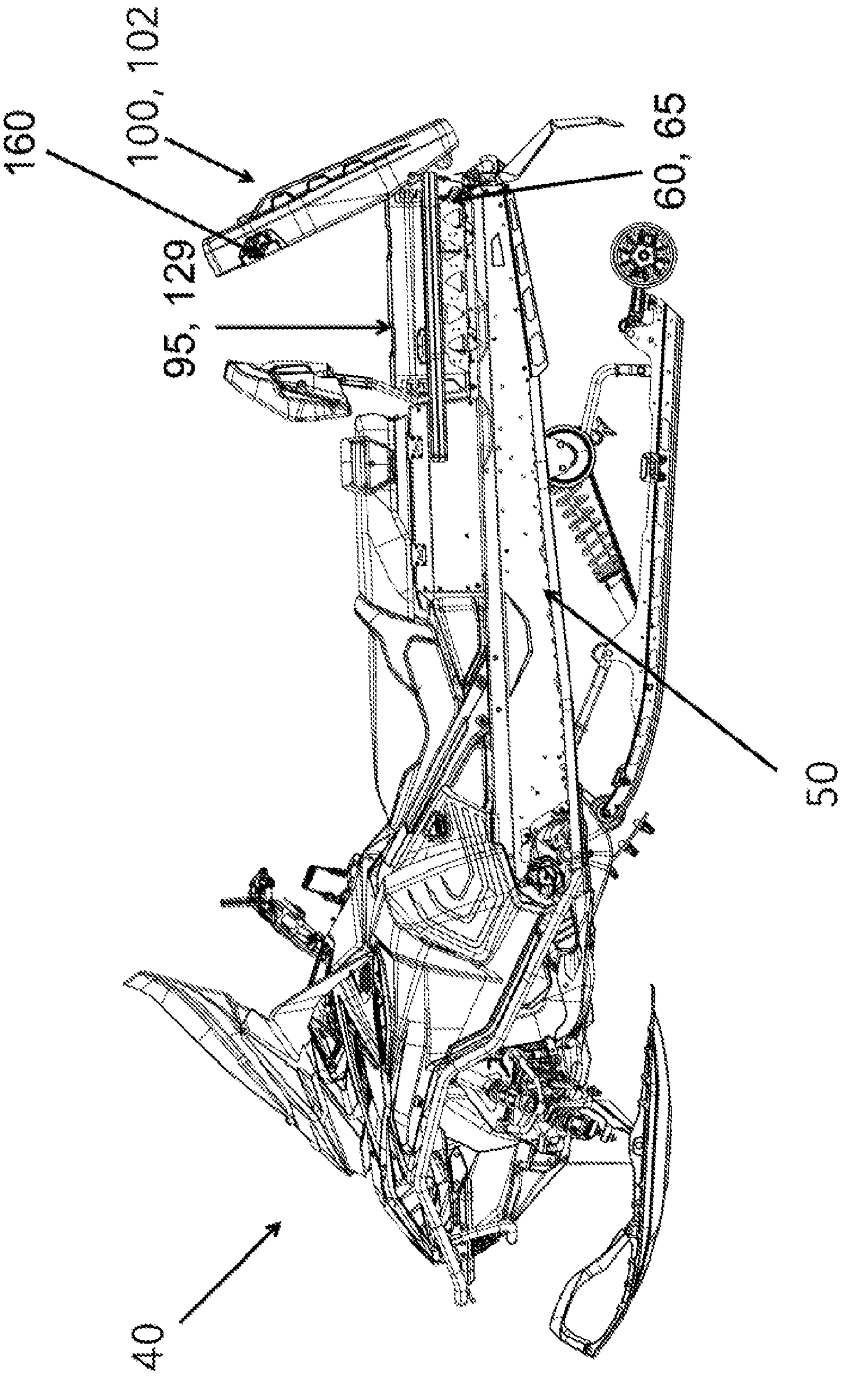
FIG. 2 is the left side elevation view of the snowmobile and the stacking assembly of FIG. 1, with the stacking assembly in an open position.

In an open position, the platform body 105 is pivoted up and away from horizontal such that the portion of the rear area of the tunnel 50 is at least partially revealed, see FIGS. 2, 4, and 5. As the connection portion 140 is pivotally connected to a rear portion of the platform body 105 and connected to a rear portion of the bumper 60, a front end of the platform body 105 pivots upward and rearward when pivoting from the closed position to the open position. It is contemplated that the relative arrangement of the hinge 150 and the vehicle could vary in different embodiments. For example, the hinge 150 could be disposed to one of the left and right sides such that the platform body 105 could pivot right or left, rather then forward and rearward.

As is mentioned briefly above, the accessory receiving space 129 is formed between the platform body 105 and the tunnel 50 for receiving accessories therein. When the platform body 105 is in the open position, the space 129 is open to permit introduction or removal of the accessory 95.

In the closed position, when the accessory 90 is connected to the top surface 110 of the platform body 105 and the accessory 95 is disposed in the receiving space 129, the accessories 90, 95 are connected to the snowmobile 40 and organized in a stacked configuration (see FIG. 3). This arrangement conserves space, relative to connecting each accessory 90, 95 directly to the tunnel 50. Additionally, the stacking assembly 100 is configured such that when the accessory 90 is connected to the platform body 105, the platform body 105 is capable of being pivoted between the closed position and the open position with the accessory 90 connected thereto. In this way, the accessory 90 need not be disconnected in order to access or remove the accessory 95 disposed thereunder.

Depending on the particular embodiment, the assembly 100 could be provided in the form of an accessory stacking kit, including the assembly 100 and a plurality of fasteners for connecting the assembly 100 to the vehicle (such as the snowmobile 40). In some embodiments, such a kit could further include the bumper 60 or a combination of the bumper 60 and the bumper support bracket 65. It is also contemplated that such a kit may include only the accessory platform 102, for example in embodiments of a vehicle where the bumper 60 is formed to receive the anchors 160 of the accessory platform 102 directly therein and the attachment fixtures 175 are unnecessary.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A stacking assembly for connecting to a vehicle, the stacking assembly comprising:
- an accessory platform including:
  - a platform body arranged and configured to receive an accessory on a top surface of the platform body, a bottom surface of the platform body having a generally inverted U-shaped cross-section,
  - at least one attachment device connected to the platform body, and
  - a connection portion configured for connecting to a bumper of the vehicle, the platform body being pivotally connected to the connection portion; and
- at least one attachment fixture for selectively receiving the at least one attachment device, the at least one attachment fixture being configured for connecting to the vehicle,
- the stacking assembly being configured such that when the stacking assembly is installed on the vehicle:
  - the connection portion being connected to the bumper of the vehicle,
  - the at least one attachment fixture being connected to the bumper,
  - the platform body being pivotable relative to the bumper when the at least one attachment device is separated from the at least one attachment fixture, and
  - when the at least one attachment device is received in and secured to the at least one attachment fixture, the platform body being secured to the vehicle to prevent pivoting of the platform body, the platform body extending generally horizontally over at least a portion of a rear area of the vehicle,
  - an accessory receiving space is formed between a top surface of the portion of the rear area and the bottom surface of the platform body,
  - the accessory receiving space is configured to receive an other accessory therein, and
  - the accessory receiving space is open to permit introduction or removal of the other accessory in the accessory receiving space when the platform body is pivoted up and away from horizontal such that the portion of the rear area is at least partially revealed,
  - the connection portion comprising a bracket defining a plurality of holes therein for receiving fasteners for connecting the bracket to the bumper,
  - the plurality of holes of the bracket for receiving fasteners for connecting to the bumper being a first plurality of holes,
  - the bracket defining a second plurality of holes therein for receiving fasteners for connecting the bracket to a rear portion of the vehicle.

2. The assembly of claim 1, wherein the stacking assembly is configured such that when the assembly is installed on the vehicle:
- in a first position, the platform body is arranged generally horizontally and extends over at least the portion of the rear area of the vehicle; and
- in a second position, the platform body is pivoted up and away from horizontal such that the portion of the rear area is at least partially revealed.

3. The assembly of claim 2, wherein:
- the connection portion is pivotally connected to a rear portion of the platform body; and
- the stacking assembly is configured such that when the assembly is installed on the vehicle,
  - the connection portion is connected to a rear portion of the bumper, and
  - a front end of the platform body pivots upward and rearward when pivoting between the first position and the second position.

4. The assembly of claim 3, wherein:
- the at least one attachment device is connected to a forward portion of the platform body;

the stacking assembly is configured such that when the assembly is installed on the vehicle, the at least one attachment fixture is connected to a forward portion of the bumper.

5. The assembly of claim 2, wherein the at least one attachment device is received in the at least one attachment fixture when the platform body is in the first position.

6. The assembly of claim 2, wherein the stacking assembly is configured such that when the assembly is installed on the vehicle and the accessory is connected to the platform body, the platform body is configured to pivot between the first position and the second position with the accessory connected to the platform body.

7. The assembly of claim 1, wherein the top surface of the platform body defines at least one aperture therein configured to receive at least one accessory attachment device of the accessory therein for selectively connecting the accessory to the platform body.

8. The assembly of claim 7, wherein:

the at least one aperture is a plurality of apertures;

the at least one accessory attachment device is a plurality of accessory attachment devices; and each aperture of the plurality of apertures is configured to receive a corresponding attachment device of the plurality of attachment devices.

9. The assembly of claim 7, wherein:

the at least one accessory attachment device of the accessory includes at least one anchor;

the at least one anchor of the accessory includes a fastener portion; and the at least one aperture in the top surface is configured to receive the fastener portion of the at least one anchor.

10. The assembly of claim 7, wherein:

the at least one aperture in the top surface is formed in at least one of a right side portion and a left side portion of the top surface; and the at least one aperture is sized and arranged for receiving at least one securing strap element for securing the accessory to the platform body.

11. The assembly of claim 1, wherein the bracket is pivotally connected to the platform body by a hinge.

12. The assembly of claim 1, wherein:

the at least one attachment device is at least one anchor connected to the platform body;

the at least one anchor includes a fastener portion rotatable relative to the platform body;

the at least one attachment fixture includes at least one anchor fixture;

the at least one anchor fixture defines an opening and an anchor chamber therein; and the opening and the anchor chamber of the at least one anchor fixture are sized and arranged to selectively receive the fastener portion of the at least one anchor therein.

13. The assembly of claim 1, wherein the at least one attachment fixture is configured for connecting to the bumper.

14. The assembly of claim 13, wherein:

the at least one attachment device includes:

a first attachment device connected to a forward portion of a right side of the platform body, and a second attachment device connected to a forward portion of a left side of the platform body; and the at least one attachment fixture includes:

a first attachment fixture for connecting to a right side of the bumper, and a second attachment fixture for connecting to a left side of the bumper.

15. The assembly of claim 13, wherein the at least one attachment fixture comprises:

an L-shaped bracket defining at least one hole for receiving at least one fastener for connecting the at least attachment fixture to the bumper; and an anchor fixture connected to the L-shaped bracket.

16. The assembly of claim 1, wherein:

a bottom surface of the platform body defines at least one recess therein; and the at least one recess is shaped and sized to receive a portion of an other accessory disposed under the platform body when the assembly is installed on the vehicle.

17. A stacking assembly for connecting to a vehicle, the stacking assembly comprising:

an accessory platform including:

a platform body arranged and configured to receive an accessory on a top surface of the platform body, a bottom surface of the platform body having a generally inverted U-shaped cross-section, at least one attachment device connected to the platform body, and a connection portion configured for connecting to a bumper of the vehicle, the platform body being pivotally connected to the connection portion; and at least one attachment fixture for selectively receiving the at least one attachment device, the at least one attachment fixture being configured for connecting to the vehicle, the stacking assembly being configured such that when the stacking assembly is installed on the vehicle:

the connection portion being connected to the bumper of the vehicle, the at least one attachment fixture being connected to the bumper, the platform body being pivotable relative to the bumper when the at least one attachment device is separated from the at least one attachment fixture, and when the at least one attachment device is received in and secured to the at least one attachment fixture, the platform body being secured to the vehicle to prevent pivoting of the platform body, the platform body extending generally horizontally over at least a portion of a rear area of the vehicle, an accessory receiving space is formed between a top surface of the portion of the rear area and the bottom surface of the platform body, the accessory receiving space is configured to receive an other accessory therein, and the accessory receiving space is open to permit introduction or removal of the other accessory in the accessory receiving space when the platform body is pivoted up and away from horizontal such that the portion of the rear area is at least partially revealed, the connection portion comprising a bracket defining a plurality of holes therein for receiving fasteners for connecting the bracket to the bumper, the plurality of holes of the bracket for receiving fasteners for connecting to the bumper being a first plurality of holes, the bracket defining a second plurality of holes therein for receiving fasteners for connecting the bracket to a rear portion of the vehicle;

wherein the vehicle is a snowmobile including a tunnel; and the stacking assembly is configured such that when the assembly is installed on the vehicle:

the connection portion is fastened to the bumper by at least one first fastener extending through at least one of the first plurality of holes, and the connection portion is fastened to a rear side of the tunnel by at least one second fastener extending through at least one of the second plurality of holes.

* * * * *